May 21, 1963 I. W. RICHARDSON 3,090,562
SPRAY RIGGER BOOM
Filed Aug. 6, 1962 3 Sheets-Sheet 1

INVENTOR
Irwin W. Richardson
BY
ATTORNEY

May 21, 1963　　　I. W. RICHARDSON　　　3,090,562
SPRAY RIGGER BOOM

Filed Aug. 6, 1962　　　　　　　　　　　3 Sheets-Sheet 2

INVENTOR
Irwin W. Richardson
BY
ATTORNEY

May 21, 1963 — I. W. RICHARDSON — 3,090,562
SPRAY RIGGER BOOM
Filed Aug. 6, 1962 — 3 Sheets-Sheet 3
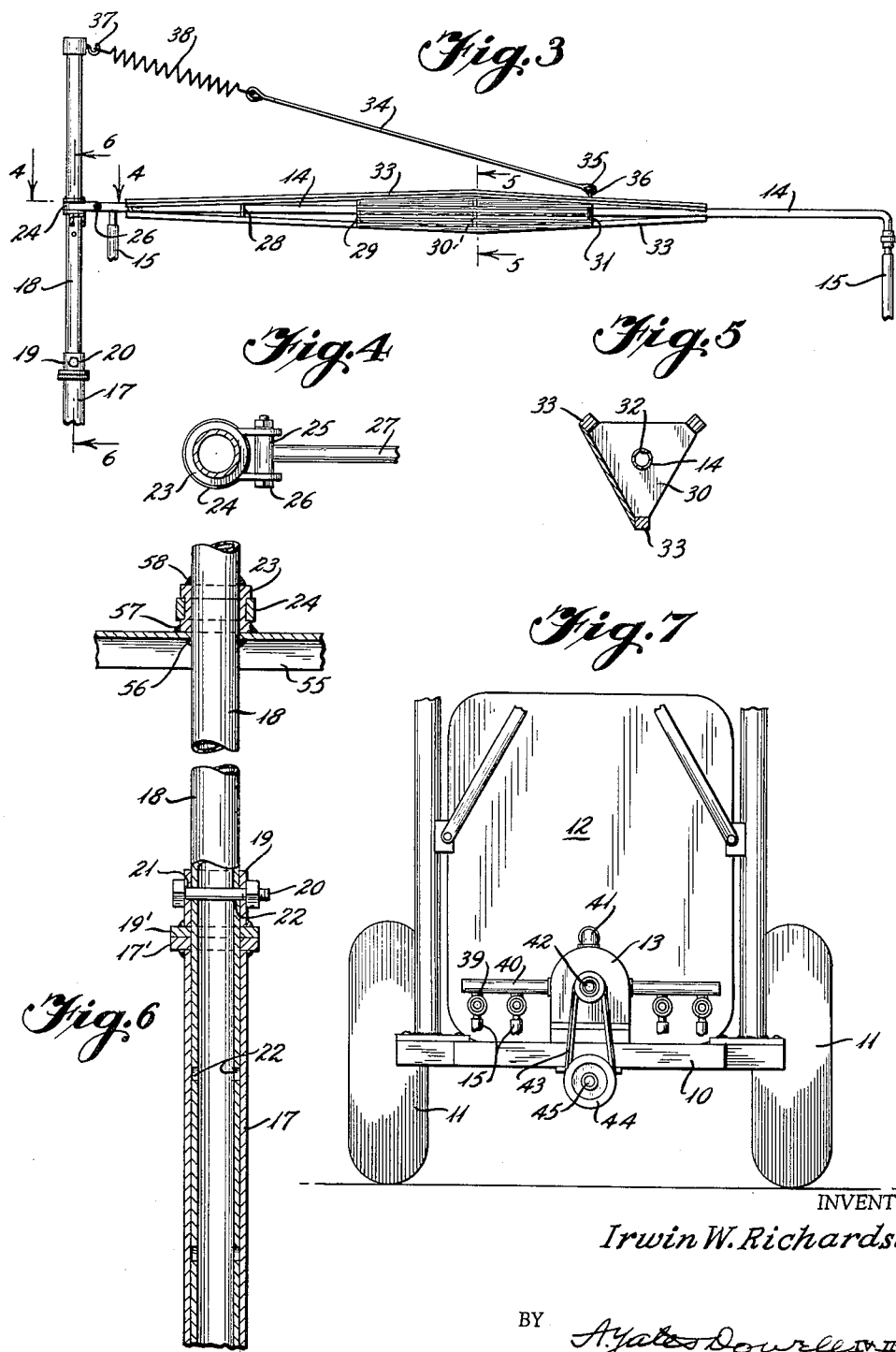
INVENTOR
Irwin W. Richardson
BY
ATTORNEY

United States Patent Office 3,090,562
Patented May 21, 1963

3,090,562
SPRAY RIGGER BOOM
Irwin W. Richardson, Lady Lake, Fla.
Filed Aug. 6, 1962, Ser. No. 215,196
6 Claims. (Cl. 239—167)

This invention relates to the harvesting of crops of various kinds, to the cultivation of such crops in order that it be possible to harvest maximum yield, and to equipment utilized in the care and treatment to promote maximum harvest.

The invention relates specifically to apparatus and equipment by means of which the spraying of growing trees and plants including groves of citrus trees and the like may be accomplished with maximum efficiency and minimum effort and expense.

In caring for plants including during crop growth, it has been found advisable to spray growing crops including substantially the entire foliage and this has been done inefficiently, inadequately, and wastefully, as well as at a very substantial expenditure of time and labor resulting in relatively high cost of the harvested crop.

It is an object of the invention to overcome the difficulties enumerated and to facilitate the care of crops to be subsequently harvested including the provision of spraying apparatus or equipment by which a relatively large crop area may be treated easily, quickly, thoroughly, and with minimum waste, and with such apparatus and equipment including spray mechanism with boom forming pivoted arms supporting spray hose or conduits for the material sprayed in a manner to permit maximum swinging movement and the control of the discharge end of such spray in accordance with the will of the workman handling the same.

Figure 1:
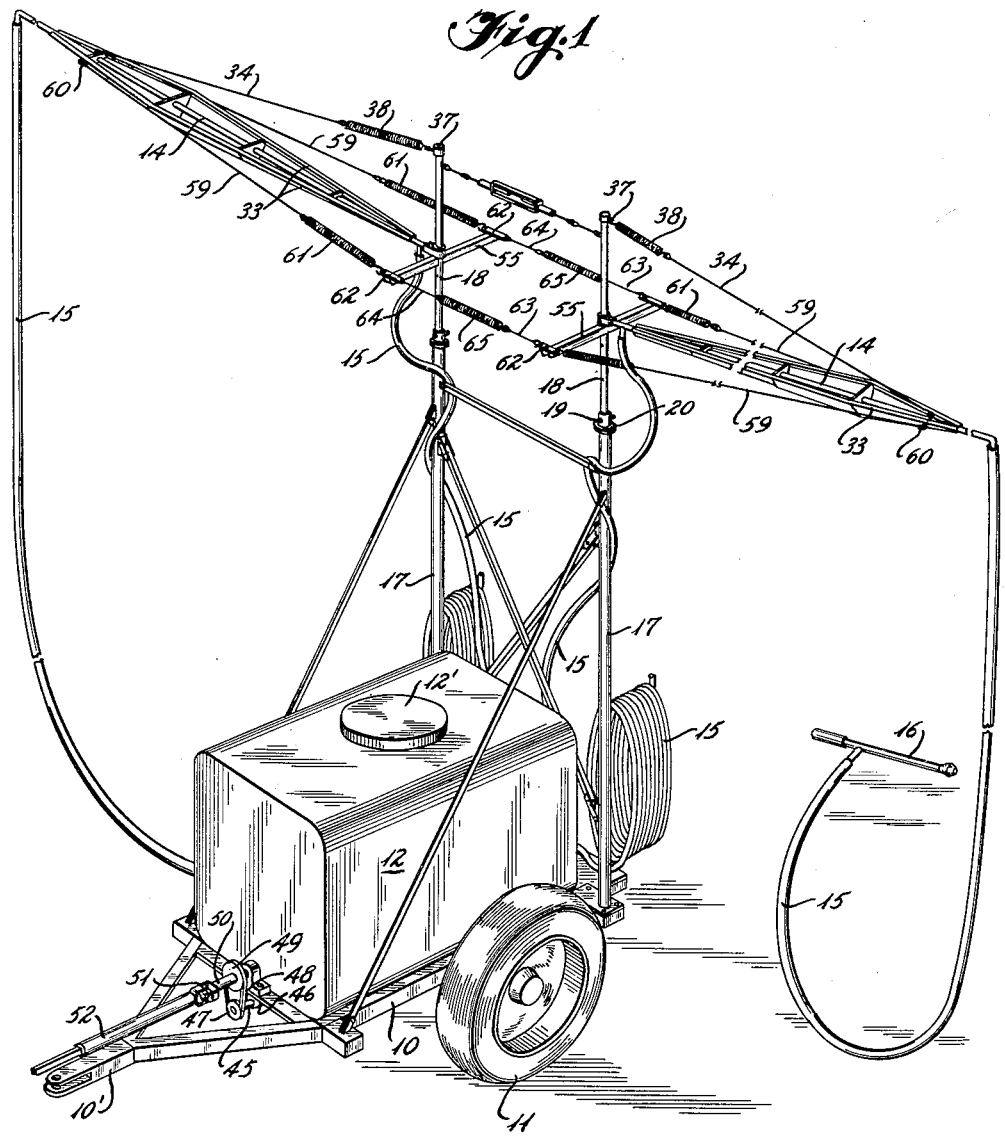
Figure 2:
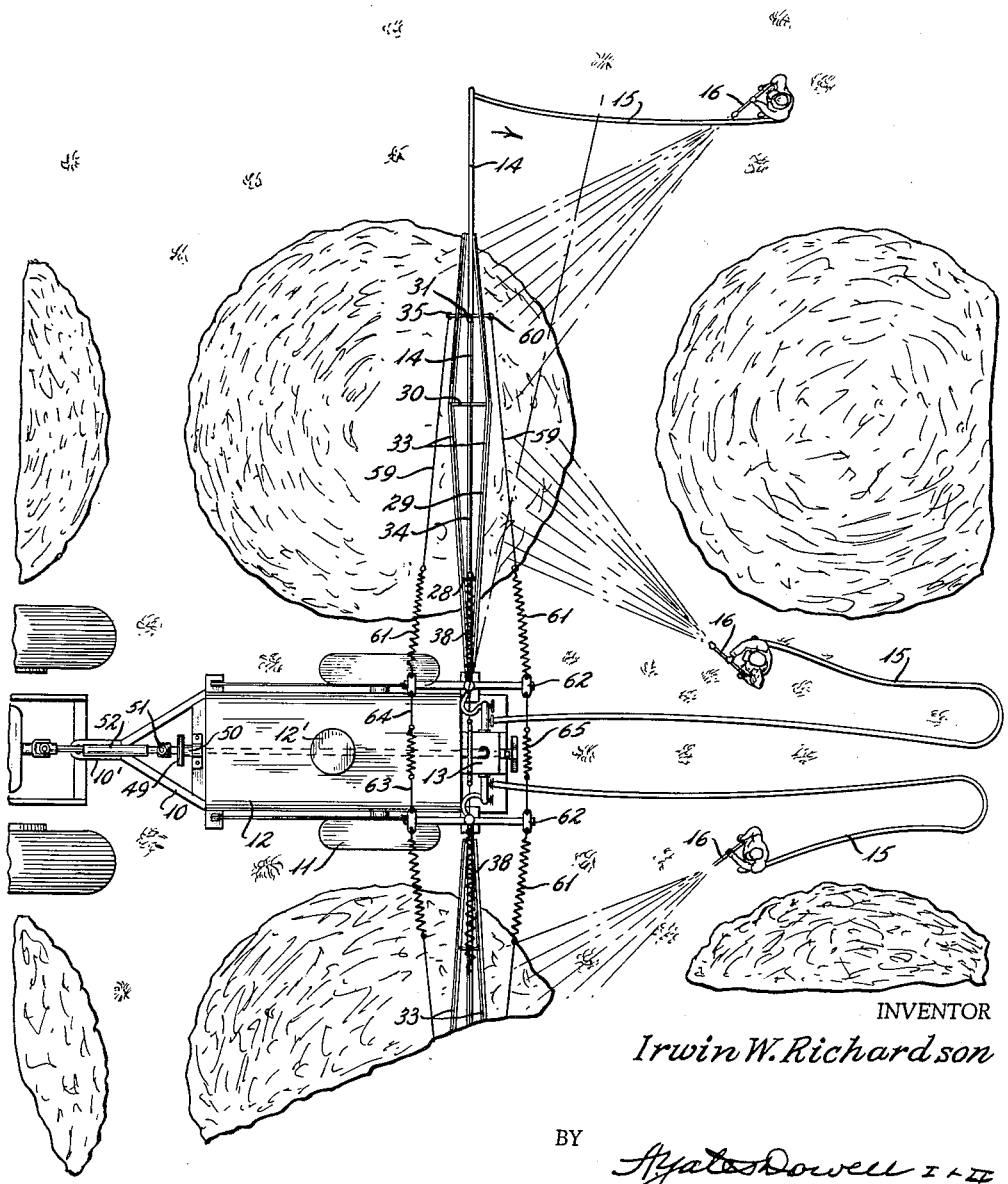

Other objects and advantages of the invention will be apparent from the following description taken in conjunction with the accompanying drawing(s) wherein:

FIG. 1 is a perspective illustrating one application of the invention;

FIG. 2, a top plan view illustrating the manner of use of the invention;

FIG. 3, an enlarged fragmentary view of one of the sprayer booms and its mounting;

FIG. 4, a horizontal section on the line 4—4 of FIG. 3;

FIG. 5, a vertical section on the line 5—5 of FIG. 3;

FIG. 6, a vertical section on the line 6—6 of FIG. 3; and

FIG. 7, a rear elevation of the vehicle and tank of FIG. 1.

Briefly stated, the invention is a harvest promoting spray rig including oppositely disposed pivoted mountings, each having a boom or outrigger and a bar at right angles thereto with its center thereon and with springs between the bars to increase the amount of movement while maintaining spring tension on the boom forming pivoted arms to enable the workman to apply and direct the spray from various angles.

With continued reference to the drawing, the present invention is intended to be applied to a self-propelled vehicle including either a tractor or a truck, or to a trailer-type vehicle. As illustrated it may include a chassis or frame 10 mounted on wheels 11 for carrying a tank 12 of any practical size, 500 gallons being the common size used, and from which the material to be forcibly discharged, by means of pressure supplied from a pump 13 or other source of power, may be sprayed through pipes and hose 14 and 15 respectively and with controllable discharge nozzles 16 adapted to be manipulated by workmen to direct the discharge therefrom over the areas to be sprayed and onto vegetation as well as on other areas and other substances.

The pipes, hose and spray nozzles are relatively heavy and are subjected to substantial pressure making it impractical for a workman to carry and manipulate the same particularly if such workman is required to move toward and away from the vehicle and around various trees and other objects, and also limiting the spraying operation of a single worker to a single row of trees.

The present invention provides a satisfactory support for a hose at each side of the frame or machine to which it is applied as well as means for maintaining the proper relation. This is accomplished by means of a post fixed to the chassis 10, each post comprising a lower fixed telescopic section 17 and an upper or second telescopic section 18, the post 17 preferably being tubular to receive the second tubular member 18, a collar 19 being provided carrying a bolt 20 which extends through openings 21 and 22 in the overlapping telescoped portions of the pipe.

On each of the posts above the fixed collar is a second collar 23 enclosed by a clamp 24 to which is attached hinge member 25 by means of a bolt 26. To the hinge member 25 is attached the generally horizontal transverse boom forming pipe 14, having a depending end near the post 17 to which the hose 15 is connected. To the outer end of pipe 14 is attached the hose 15 which extends to the nozzle 16.

Pipe 14 is reinforced by means of a series of transverse plates 28, 29, 30 and 31, each having a central opening such as the opening 32 (FIG. 5) in the support 30, corner struts or braces 33 being added for their reinforcing effect. A relatively strong spray arm is produced capable of moving elevationally about the hinged member 25 but normally retained outwardly in a generally horizontal position by means of a brace 34 having an eye 35 at one end, connected to a hook 36 attached to the support 31, and having its opposite end connected to another hook 37 with an interposed spring 38 which yieldably maintains the arm in position although allowing its being pulled down and to return to a generally horizontal position when released.

Supply of spray material from the tank 12 to the pipe 14 is through the hose 15 by means of a pump 13 from a header 40 and valve connections 39, the pump having a connection 41 with the tank 12, and being driven by means of a pulley 42, a belt 43 and pulley 44 from a shaft 45. The shaft 45 is mounted in bearings 46 and extends beneath and to the opposite end of the tank where it has fixed thereto a pulley 47 driven by a belt 48, from a pulley 49 fixed on a shaft 50. The shaft 50 preferably is connected by a universal joint 51 to a telescopic or extensible shaft 52 driven from the power take-off of the tractor or other motorized vehicle to which the device is connected.

The chassis 10 has a draw bar connection 10′ for attachment to the tractor or propelling vehicle. The spray tank 12 may have a filling opening 12′. The device may be drawn by a tractor from which power may be derived for driving the pump to force substance in fluid condition whether in solid, liquid or gaseous state from the tank 12.

The collar 19 has a flange 19′ which bears against a flange 17′ welded or otherwise attached to the top of the post 17 so that the upper telescopic section 18 and the collar 19 attached thereto can rotate relative to the fixed lower post 17. A cross arm 55 is welded or otherwise permanently attached to the upper post 18 by welds 56 and attached to the collar 23 by welds 57. The collar 23 is additionally attached to the post 18 by welds 58 and the clamp 24 is rotatably mounted on such collar so that the boom can rotate independently of the upper post 18. The cross arms 55 extend outwardly from each side of each post substantially in alignment with the direction of travel of the vehicle and generally perpendicular to the boom.

The outer free ends of each of the cross arms is connected to the free end of the adjacent boom by means of braces 59 having an eye 60 on end connected to hooks 36 attached to the boom. The opposite end of each of the braces 59 is connected to spring members 61 which in turn are connected to plates 62 welded or otherwise attached to the free ends of the cross arms 55. The tension of one of the springs 61 will counteract the tension of the spring on the opposite side to provide a floating action for the end of the boom while maintaining the boom in substantially a fixed lateral position.

In order to provide additional spring action for the end of the booms, the cross arms 55 on each of the posts are interconnected by braces 63 and 64 with a spring member 65 interposed therebetween.

In the operation of the device the upper post is raised sufficiently to pass over the tops of the trees to be sprayed so that when the trailer is pulled down a row of trees, a plurality of workers are provided with high pressure, high capacity spray for treating both sides of two rows of trees, two of the workers being in the same row as the trailer and propelling vehicle and two of the workers being located in adjacent rows. As the trailer moves down the row of trees, the pump forces the fluid through the hoses so that the spray can be administered to the trees. In the event that an obstruction will prevent the passage of one of the booms, such boom can be pivoted rearwardly by the worker in the adjacent row and such worker can pass between rows into the row in which the vehicle is traveling until the obstruction is passed after which he will pass back through the row of trees to his original position. When the boom is rotated substantially 90° tension will be applied to the spring 61 opposite the direction of rotation which will cause the upper post 18 to rotate and apply tension to the spring 65 intermediate the cross arms and such tension will rotate the opposite cross arm slightly to apply tension to the spring 61 on the opposite boom. The tension applied to all of the springs is resisted by the springs on the side towards which the boom is being pivoted so that a triple spring action is applied to the boom to return the boom to its original position extending over the row of trees. If the boom should strike the top of one of the trees, the spring action will permit the boom to ride over or around the obstruction without causing damage to the trees.

It will be apparent from the foregoing that the present invention provides a practical, readily usable antenna type conduit or hose carrying and transporting device by which workmen may perform the several spraying operations with minimum effort and in a minimum of time and attention.

It will be obvious to those skilled in the art that various changes may be made in the invention without departing from the spirit and scope thereof and therefore the invention is not limited by that which is illustrated in the drawing(s) and described in the specification, but only as indicated in the accompanying claims.

What is claimed is:

1. A portable antenna type spray device comprising a supporting structure, a pair of posts mounted in spaced relation on said supporting structure, each post including a lower fixed portion and an upper telescopic portion rotatably connected to the lower portion, a crossarm fixed to each of the upper portions, a boom rotatably connected to each of said crossarms and normally extending outwardly therefrom in opposite directions, a first resilient means connecting the upper portions of said posts to the free ends of said booms, a second resilient means connecting the free ends of each of said booms to the free ends of the cooperating crossarm, and intermediate spring means connecting the free ends of one crossarm with the free ends of the other crossarm whereby when one of the booms is moved laterally spring tension will be applied by multiple springs including the second resilient means on the side opposite the movement, the intermediate spring means and the second resilient means of the opposite boom.

2. A portable spray boom assembly comprising a pair of spaced rotatable posts, a crossarm fixed to each of said posts, a cooperating boom pivotally mounted on each of said crossarms and normally extending outwardly therefrom in opposite directions, a first resilient means connecting the free end of each of said booms to one end of the crossarm on which it is mounted, a second resilient means connecting the free end of each of said booms to the other end of the crossarm on which it is mounted, a third resilient means connecting the free ends of said one end of said crossarms, and a fourth resilient means connecting said other end of said crossarms whereby lateral movement of one of said booms will apply tension to the resilient means on the side of said boom opposite the movement, and cause the crossarm and post to rotate and apply tension to the resilient means connecting said crossarms which in turn causes the other crossarm and post to rotate slightly and apply tension to the resilient means on the opposite boom.

3. The structure of claim 2 in which the free end of each of said booms is connected by resilient means to the top of the post on which it is mounted.

4. The structure of claim 2 including means for raising and lowering said posts.

5. The structure of claim 2 including a container for material to be sprayed, means for discharging the material from said container, and conduit means extending from said container along each of said booms and beyond the free ends thereof.

6. The structure of claim 5 including spray control means at the free ends of said conduits.

References Cited in the file of this patent
UNITED STATES PATENTS

| | | |
|---|---|---|
| 855,496 | Barber | June 4, 1907 |
| 912,966 | Lamiell | Feb. 16, 1909 |
| 2,231,229 | Spreng | Feb. 11, 1941 |
| 2,367,135 | Moon et al. | Jan. 9, 1945 |
| 2,655,405 | Lattner | Oct. 13, 1953 |
| 2,671,690 | Ekrenkrook | Mar. 9, 1954 |
| 2,719,754 | Weller | Oct. 4, 1955 |
| 2,946,514 | Johnson | July 26, 1960 |
| 2,985,379 | Strickland | May 23, 1961 |